US009607325B1

(12) United States Patent     (10) Patent No.: US 9,607,325 B1
Sriram     (45) Date of Patent: Mar. 28, 2017

(54) BEHAVIOR-BASED ITEM REVIEW SYSTEM

(75) Inventor: Siddharth Sriram, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 13/550,406

(22) Filed: Jul. 16, 2012

(51) Int. Cl.
| G06F 3/048 | (2013.01) |
| G06Q 30/02 | (2012.01) |
| G06Q 30/06 | (2012.01) |
| G06F 3/0482 | (2013.01) |
| G06F 17/30 | (2006.01) |

(52) U.S. Cl.
CPC ..... *G06Q 30/0282* (2013.01); *G06Q 30/0601* (2013.01); *G06Q 30/0641* (2013.01); *G06F 3/0482* (2013.01); *G06F 17/30867* (2013.01); *G06Q 30/0631* (2013.01)

(58) Field of Classification Search
CPC ........... G06Q 30/0282; G06Q 30/0601; G06Q 30/0631; G06Q 30/0641; G06F 17/30867; G06F 3/0482
USPC ........................................ 715/745, 747, 762
See application file for complete search history.

(56) References Cited

U.S. PATENT DOCUMENTS

| 6,829,348 | B1 | 12/2004 | Schroeder et al. |
| 7,428,496 | B1 | 9/2008 | Keller et al. |
| 7,552,068 | B1 | 6/2009 | Brinkerhoff |
| 7,603,367 | B1 * | 10/2009 | Kanter et al. |
| 7,664,669 | B1 | 2/2010 | Adams et al. |
| 8,001,003 | B1 | 8/2011 | Robinson et al. |
| 8,315,895 | B1 * | 11/2012 | Kilat et al. .................... 705/7.11 |
| 8,515,828 | B1 * | 8/2013 | Wolf et al. .................... 705/26.7 |
| 8,645,295 | B1 | 2/2014 | Dillard |
| 2004/0009462 | A1 | 1/2004 | McElwrath |
| 2004/0024739 | A1 | 2/2004 | Copperman et al. |
| 2005/0192958 | A1 | 9/2005 | Widjojo et al. |
| 2006/0129446 | A1 * | 6/2006 | Ruhl et al. ..................... 705/10 |
| 2006/0212362 | A1 * | 9/2006 | Donsbach et al. ............. 705/26 |
| 2007/0192166 | A1 | 8/2007 | Van Luchene |
| 2007/0226374 | A1 | 9/2007 | Quarterman et al. |

(Continued)

OTHER PUBLICATIONS

Christopher Scaffidi, et al. "Red Opal: product-feature scoring from reviews." Proceedings of the 8th ACM conference on Electronic commerce. ACM, 2007.*

(Continued)

*Primary Examiner* — Doon Chow
*Assistant Examiner* — Andrew T Chiusano
(74) *Attorney, Agent, or Firm* — Knobbe, Martens, Olson & Bear LLP

(57) ABSTRACT

Systems and associated processes for generating user attribute interest data and using that data to present and/or develop reviews of items are described herein. These systems and processes can dynamically collect data on a user's interest in specific item attributes from the user's interaction with an electronic catalog and can store this data in association with the user. This data may be used to provide users with a personalized set of reviews which will provide the user with information relevant to interesting item attributes. Further, this data may be used to display a set of dynamically generated statements and/or questions that prompt users to write an item review on specific item attributes. Accordingly, user attribute interest data can potentially both present and elicit more thorough and useful feedback than existing review systems in some embodiments.

28 Claims, 8 Drawing Sheets

(56) References Cited

U.S. PATENT DOCUMENTS

| | | | |
|---|---|---|---|
| 2008/0028313 A1 | 1/2008 | Ebert | |
| 2008/0071602 A1* | 3/2008 | Ojakaar et al. | 705/10 |
| 2008/0082499 A1* | 4/2008 | Koski | 707/3 |
| 2008/0215571 A1* | 9/2008 | Huang et al. | 707/5 |
| 2008/0270326 A1 | 10/2008 | Musgrove et al. | |
| 2009/0063288 A1* | 3/2009 | Croes | 705/26 |
| 2009/0083096 A1* | 3/2009 | Cao et al. | 705/7 |
| 2009/0171813 A1* | 7/2009 | Byrne et al. | 705/27 |
| 2009/0248666 A1* | 10/2009 | Ahluwalia | 707/5 |
| 2009/0282019 A1* | 11/2009 | Galitsky et al. | 707/5 |
| 2009/0307159 A1 | 12/2009 | Pinckney et al. | |
| 2010/0161599 A1* | 6/2010 | Daughtry | G06F 17/30867 707/736 |
| 2010/0169317 A1* | 7/2010 | Wang et al. | 707/736 |
| 2011/0145219 A1* | 6/2011 | Cierniak | G06F 17/30867 707/709 |
| 2011/0173191 A1 | 7/2011 | Tsaparas et al. | |
| 2011/0251871 A1 | 10/2011 | Rogers et al. | |
| 2011/0276513 A1 | 11/2011 | Erhart et al. | |
| 2012/0209751 A1* | 8/2012 | Chen et al. | 705/27.2 |
| 2012/0278065 A1* | 11/2012 | Cai et al. | 704/9 |
| 2013/0007011 A1* | 1/2013 | Setlur et al. | 707/748 |
| 2013/0117329 A1* | 5/2013 | Bank | G06F 17/30873 707/803 |
| 2013/0204675 A1 | 8/2013 | Dobell | |
| 2013/0204833 A1* | 8/2013 | Pang | G06Q 30/02 706/52 |
| 2013/0218914 A1* | 8/2013 | Stavrianou et al. | 707/755 |
| 2014/0164302 A1* | 6/2014 | Di Fabbrizio | G06Q 30/0631 706/46 |
| 2014/0172744 A1* | 6/2014 | El-Hmayssi | G06Q 50/01 705/347 |
| 2015/0066803 A1* | 3/2015 | Aneja | G06Q 30/0282 705/347 |

OTHER PUBLICATIONS

Best Buy Review page, http://www.bestbuy.com/site/olspage.jsp?id=pcat17100&type=page&bvd . . . , 4 pages retrieved Jan. 9, 2012.

* cited by examiner

BEHAVIOR-BASED ITEM REVIEW SYSTEM

BACKGROUND

Networked systems have become an increasingly prevalent and vital technology. Networks, such as the Internet, allow large numbers of computer systems and people to swiftly transfer data across the globe. These networks are often used to provide network applications, such as web applications and mobile applications, to end users. These web and mobile applications are often hosted by server computers that serve content to end user devices.

For example, ecommerce systems commonly provide various types of informational services for assisting users in evaluating products and other offerings. Such services can greatly aid consumers in deciding which product or offering to purchase. These informational services are particularly valuable for purchases over a network, where customers do not have the opportunity to physically inspect or try out products.

One type of information service involves providing feedback from product users. The feedback may be in the form of reviews that discuss the merits and drawbacks of products and services. Users can read other users' reviews to determine whether to purchase a product or service. Thus, reviews can greatly aid users' buying decisions when shopping from an ecommerce system.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
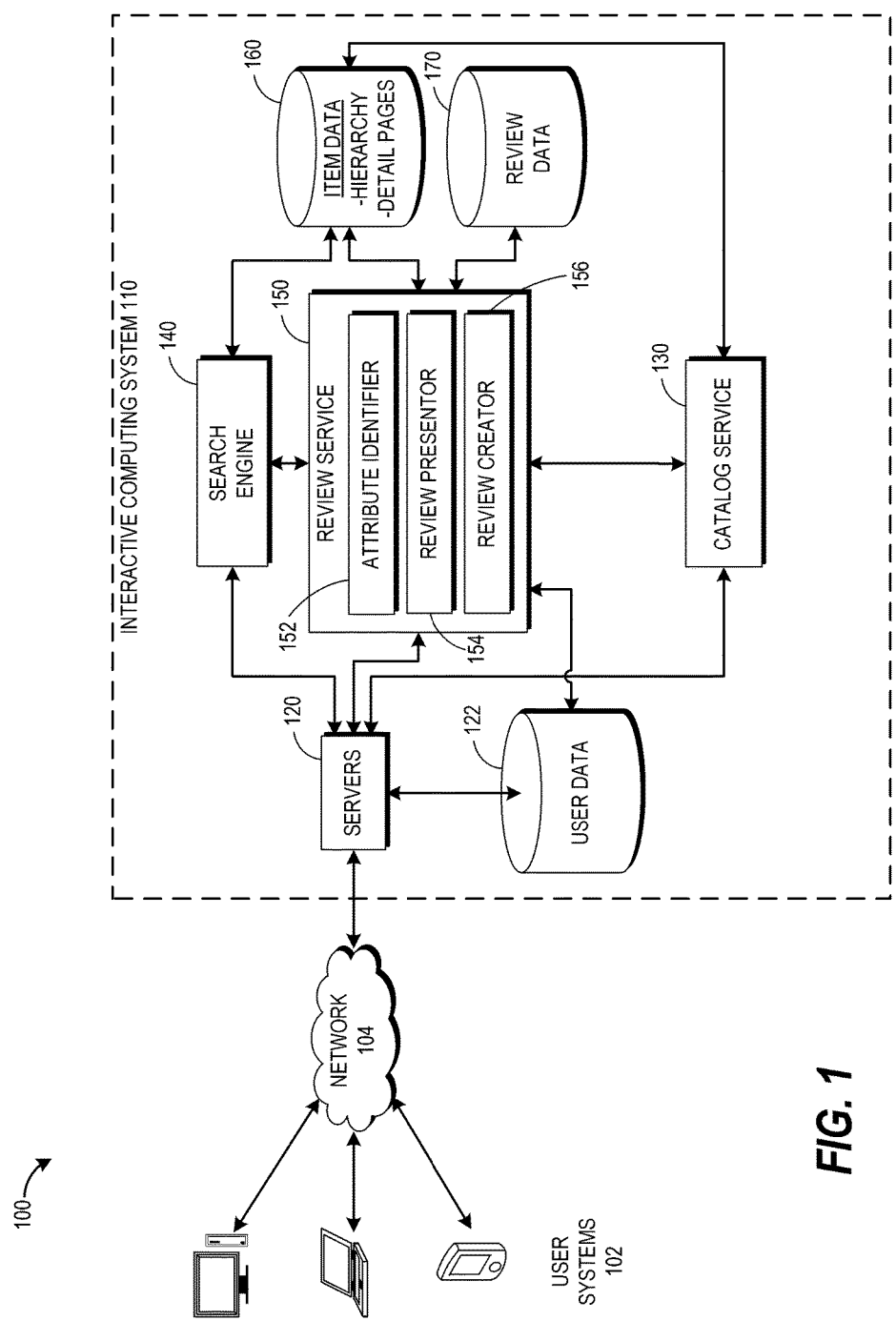
FIG. 1 illustrates an embodiment of a network environment for providing users with access to an interactive computing system for developing and providing user reviews.

User reviews often suffer from incompleteness or lack of clarity in describing an item's merits and drawbacks, which can be unhelpful to the users who may be evaluating the item for purchase. These review deficiencies may occur in a review because typical review user interfaces merely provide a blank text box or area for users to input their review. A blank text box gives no guidance to users regarding the aspects of an item that would be beneficial to review. As a result, many reviews focus on one or two characteristics of an item to the exclusion of others. It can be difficult to write useful review prose from a blank page. Users browsing through items in the catalog may be looking for information on a specific attribute of an item, and such users may want to be presented with reviews that provide relevant information. Short or undetailed reviews may not contain information that is helpful for evaluating item performance on a specific attribute.

This disclosure describes systems and associated processes for developing and presenting more useful user reviews, among other things. These systems and processes can provide targeted review presentation and creation in certain embodiments by using data about the behavior of a user with respect to an electronic catalog to collect and store data representing the interest of the user in specific item attributes. In some embodiments, this behavioral data may be used to identify and present reviews to the user which may provide helpful information on an item attribute in which the user is interested. These reviews may enable the user to make a more informed purchase decision with respect to item attributes in which the user is interested. In other embodiments, the behavioral data may be used to present guiding statements or questions to a user during review creation to develop a detailed review. The statements or questions can be relevant to a specific attribute of the item being reviewed, and as such, may be specifically and dynamically selected based on previously analyzed user behavior and data representing the user's attribute interests. Presenting guiding statements or questions to users during the review process can have the effect of reducing or eliminating the "blank page" effect of having to write a review from scratch, with no guidance. Accordingly, such attribute-specific reviews can potentially provide more thorough and useful information than existing review systems in some embodiments. There are many ways in which data representing user attribute interest can be helpful in augmenting review presentation and development, examples of which will be described below.

For purposes of illustration, the processes disclosed herein are described primarily in the context of an interactive computing system that presents users with reviews of items in an electronic catalog or catalog system, such as products and services, and also develops user reviews during the review creation process. The interactive computing system can be implemented as a network application, which may be a website, a mobile application, a combination of the same, or the like. As will be apparent, the disclosed processes can also be used in other types of systems, and can be used to guide user reviews of other types of items, such as but not limited to general products or services, electronic books ("ebooks"), websites, news articles, blogs, podcasts, travel destinations, service providers, other users (e.g., as potential friends in a social network), events, locations (such as restaurants and other establishments), discussion boards, photos and other images, online videos, tagged items, and user-generated lists of items.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. Further, not necessarily all advantages described herein are shared by every embodiment of this disclosure.

II. Interactive Computing System Overview

Prior to describing embodiments of behavior-based review functionality in detail, an example computing system in which this functionality can be implemented will be described. Referring to FIG. 1, an embodiment of a network environment 100 is depicted that can provide users with access to an interactive computing system 110 for the purpose of developing and presenting more useful user reviews of items, among other features. In the environment 100, users can access the interactive computing system 110 with user systems 102. The interactive computing system 110 can provide users with access to an electronic catalog of items, which users can browse or search to find items to purchase or otherwise access. The interactive computing system 110 can provide a detail page or other graphical user interface for some or all items. On this or another graphical user interface, the interactive computing system 110 can output targeted reviews selected to present a user with information on an item attribute in which the user has displayed an interest. The interactive computing system 110 can also output a review interface that guides users in reviewing specific attributes of items. Advantageously, in certain embodiments, the review functionality of the interactive computing system 110 can present or elicit reviews that are more detailed and helpful for users interested in the items.

The user systems 102 that access the interactive computing system 110 can include computing devices, such as desktop computers, laptop computers, tablets, personal digital assistants (PDAs), mobile phones (including smartphones), electronic book readers, other wireless devices, set-top or other television boxes, media players, game platforms, and kiosks, among others. The user systems 102 access the interactive computing system 110 over a network 104, which can be a local area network or a wide area network, such as the Internet.

The interactive computing system 110 can be implemented with one or more physical servers or computing machines, including the servers 120 shown (among possibly others). Thus, each of the components depicted in the interactive computing system 110 can include hardware and/or software for performing various features. In one embodiment, the interactive computing system 110 is a web site or a collection of web sites, which serve web pages to users. In another embodiment, the interactive computing system 110 hosts content for one or more mobile applications or other applications executed by the user systems 102. For ease of illustration, this specification often refers to graphical user interfaces in the website context. However, it should be understood that these user interfaces can be adapted for display in mobile applications or other applications.

The processing of the various components of the interactive computing system 110 can be distributed across multiple machines, networks, or other computing resources. The various components of the interactive computing system 110 can also be implemented in one or more virtual machines or cloud resources, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

In one embodiment, the user systems 102 communicate with the servers 120 of the interactive computing system 110. These servers 120 can access back-end computing devices, which may implement the other functionality of the interactive computing system 110 shown. Other computing arrangements and configurations are also possible.

The interactive computing system 110 includes a catalog service 130 and a search engine 140. Users can browse an electronic catalog provided by the catalog service 130 or query the search engine 140 to obtain information about electronic catalog content stored in an item data repository 160. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes in a hierarchy (or graph). The catalog service 130 can provide functionality for users to browse the item hierarchy in addition to searching the catalog. Users can select an item represented in the hierarchy or in a list of search results to see more details about an item. In response to a user item selection, the server 120 can provide to a user system 102 a catalog page (sometimes called an item detail page) that includes details about the selected item.

The catalog service 130 can access electronic catalog or other item data from a data repository 160. This electronic catalog information can be arranged hierarchically, with a general items (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category, which is in turn part of a broader category still, and so on, up and until the root node. While the terms "browse node," "browse category," and "category" are often used interchangeably herein, it should be understood that categories can be arranged in a flat structure instead of a hierarchical structure in some embodiments. Similarly, an electronic catalog may have a graph data representation instead of a hierarchical, tree-based representation.

The interactive computing system 110 also includes a review service 150 that enables users to review items in the electronic catalog. In the depicted embodiment, the review service 150 includes an attribute identification component 152, a review presentation component 154, and a review creation component 156. As described above, each of these components can be implemented in hardware and/or software. The attribute identification component 152 can analyze the behavior of a user with respect to an electronic catalog to collect and store data representing the interest of the user in specific item attributes. The behavior of the user can include both explicit and implicit cues as to what item attributes the user may find interesting. This attribute interest data can be stored in a user data repository 122 for later use presenting relevant reviews of an item to the user, or for outputting one or more statements or questions to elicit detailed user feedback on an item.

The review presentation component 154 can output a user interface that enables a user to view selected reviews of an item. Optionally, this feature may be omitted. However, providing a user with reviews targeted to the user's interest in specific item attributes may provide helpful information to the user for evaluating the item. The review presentation component 154 can access electronic catalog or other item data from a data repository 160. This data may include information on the attributes of some or all of the items in the catalog as well as data on which of the items possess a specific set of attributes. The review presentation component may also access the user attribute interest data stored by the attribute identification component in the user data repository 122. Further, the review presentation component may access a review data repository 170. This data may include information on the specific attributes discussed in a review. For example, the reviews may be searched by keywords to find reviews discussing a specific item attribute. In other embodiments, the review contents may be indexed, and some or all of the reviews may contain tags or markers to indicate the attributes discussed therein. By using a combination of the user attribute interest data and the item attribute data and/or the review data, the review presentation component 154 can select item reviews for presentation to a user that are relevant to the item attributes in which the user is interested.

The review creation component 156 can output a user interface for a user to write an item review. This component 156 may also be omitted in some embodiments. However, in other embodiments, the review creation component 156 beneficially aids in eliciting informative user feedback. The review creation component 156 can access a user data repository 122, which may store data representing user attribute interests, and can also access an item data repository 160 to determine whether an item being reviewed by a user is associated with an attribute in which the user has displayed an interest. This data can then be used in a variety of ways to prompt a user to give detailed item feedback.

In some embodiments, the review creation component 156 can output a review user interface which includes a statement or question designed to guide the user in creating the review, for example by asking the user to review an item attribute in which the user has displayed an interest. For instance, in the context of digital cameras, a camera can have attributes such as "battery life," "low light performance," and "# megapixels." The attribute identification component 152 may have determined, based on an analysis of a user's behavioral data, that the user is interested in the attribute "low light performance" and stored this information in the user data repository 122. If the review creation component 156 identifies an item for review as a digital camera associated with the attribute "low light performance," and the user data indicates that the user has an interest in "low light performance," the review creation component 156 can populate review statements or questions directed toward this specific camera attribute. The review creation component 156 can output such questions to users on a review creation or feedback page to elicit a review from a user that is specific to the identified attribute. As an example, in the statement "We noticed you were interested in [attribute] performance," the review creation component 156 can replace the text [attribute] with the actual attribute in which the user is interested. This question may be followed by another question, such as "How did this [item] perform on [attribute]?," where the review creation component 156 can replace the text [item] with the type of item being reviewed, for example digital camera, and can replace [attribute] with the actual attribute in which the user is interested. The review creation component 156 can therefore elicit user feedback on a specific attribute in which the user had displayed interest, thereby developing a more detailed review for presentation to other users viewing the item.

In other embodiments, the review creation component 156 may output a blank text box and allow the user to create an item review without eliciting feedback on any specific attribute. After the user has submitted the review, the review creation component 156 may programmatically evaluate the submitted review to determine whether the review contains adequate information to be helpful to future users viewing the review. A variety of criteria may be used to evaluate the review. The review creation component 156 may follow up with a user who has submitted an inadequate review by asking the user to revise the review to include information on a specific attribute. These are just a few examples of the many review creation features that are compatible with embodiments described herein. Additional example features of the review creation component 156 are described in greater detail below with respect to FIGS. 4A and 4B. For illustration purposes, many of the examples herein are described in the context of digital cameras. However, it should be understood that these examples can be adapted to other types of items, such as the example types of items described above.

III. Attribute Interest Identification Overview

Figure 2:
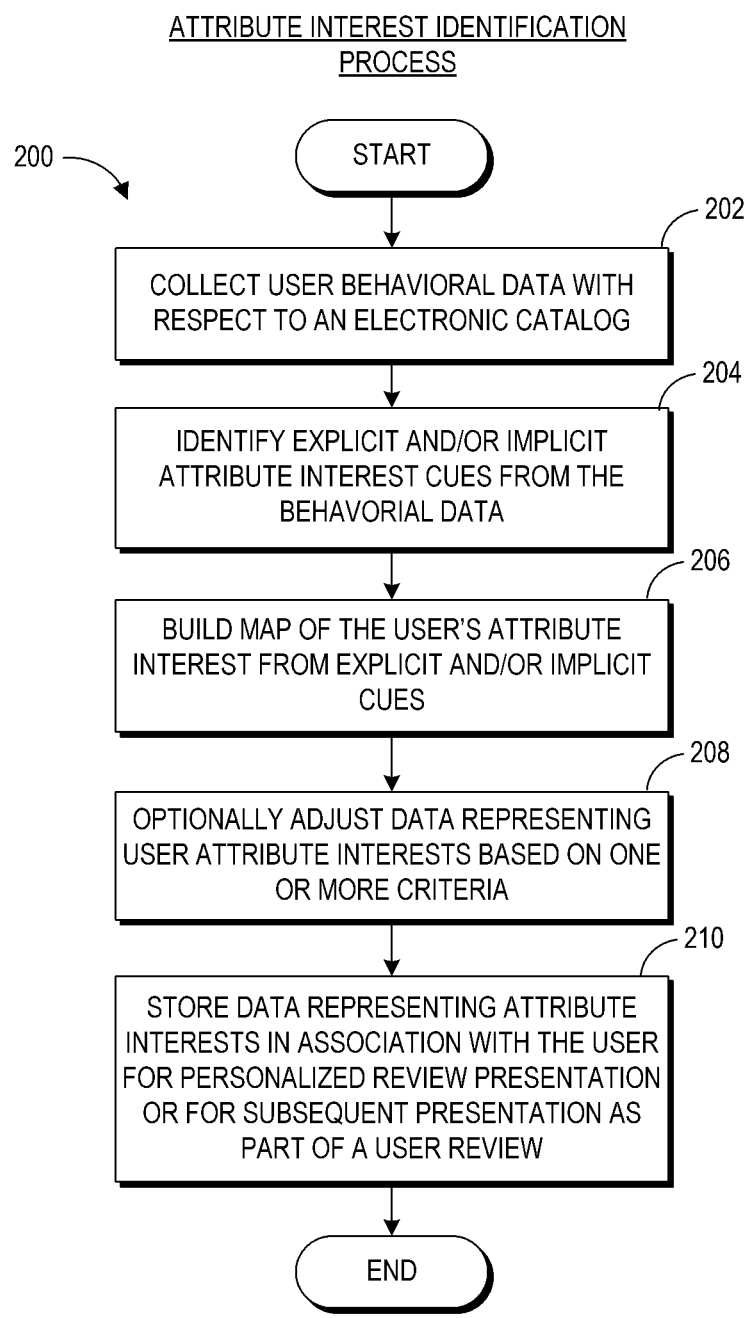
FIG. 2 illustrates an embodiment of a process for collecting data representing user interest in specific attributes of products or services.

FIG. 2 illustrates an overview embodiment of an attribute interest identification process 200. As described above, a user's interest in certain item attributes may be identified through the user's behavior with respect to the electronic catalog. The process 200 can identify the user's interest and store data representing that interest in association with the user for later use in presenting a review or creating a review. Any computing device can implement the process 200. For ease of illustration, however, the process 200 is described as being implemented by the interactive computing system 110, and in particular, the attribute identification component 152.

At block 202, the attribute identification component 152 receives information regarding a user's behavioral data with respect to an electronic catalog, such as the catalog service 130 of FIG. 1. This information may be based on explicit cues and/or implicit cues in the user's behavior regarding what catalog material the user is seeking. For example, explicit cues in some embodiments may include search terms entered by the user, or terms selected to narrow the results of a search. Another example of an explicit cue could be the length of time a user spends reading a set of reviews on a common topic. In some embodiments, software, such as an eye tracking program, may be employed to determine where a user is scrolled on a page, and the length of time the user spends looking at that portion of the page may be an implicit cue as to what the user is interested in. Implicit cues may be inferred from user behavior in certain embodiments, for example item catalogue description overlap between a set of browed items. To illustrate, a user may browse a number of different digital cameras. By accessing the item data repository 160 of FIG. 1, the attribute identification component 152 can determine that all the cameras viewed by the user have 16 megapixels. This may be an implicit cue as to the user's interest in 16 megapixel cameras. In another scenario, the user may review several different cameras, each of which has a certain memory capacity, megapixel rating, and optical zoom setting. More generally, the attribute identification component 152 can identify overlapping or shared attributes among items the user has selected (e.g., for viewing or purchase) as attributes that the user is implicitly interested in. Explicit and implicit cues, as well as other cues not expressly discussed, can indicate what material the user finds interesting.

Accordingly, at block 204, the attribute identification component 152 analyzes the explicit and/or implicit cues in the user's behavioral data to identify specific item attributes of interest to the user. In one embodiment, the attribute identification component 152 may rely solely on either explicit or implicit cues to identify attributes of interest. In another embodiment, explicit and implicit cues may be analyzed together to identify attributes of interest to the user.

In one embodiment, if the behavioral data indicates that the user interacted with an item, the attribute identification component 152 may access the item data repository 160 to compare the user's behavioral data to a known list of item attributes. In certain embodiments, the item data repository 160 may parse the items in the catalog service 130 into a plurality of categories, and data representing each category may be stored in association with a list of attributes common to some or all items in the category. It is possible to associate attribute data with root-level browse node categories and/or more detailed child and descendant browse node categories. In other embodiments, data representing each item may be stored in association with a list of some or all attributes which the item possesses.

If the behavioral data indicates that the user interacted with an item review, in certain embodiments the attribute identification component 152 may access the review data repository 170 to compare the user's behavioral data to a known list of item attributes present in the reviews. The review data repository may associate a review with a specific item attribute based on keywords present in the review. A review may also be associated with a specific attribute if the user who wrote the review was prompted to write about that item attribute during the review creation process. The attributes associated with a review may be stored in the form of a tagging system employing metadata tags, by linking entries in a list of attribute data with relevant reviews, or any other method of data association (such as item-to-attribute mappings). In embodiments which track the amount of time a user spends reading a certain parts of a review, the attribute identification component 152 may identify an attribute of interest to the user present in the portion of the review which the user spent the most time accessing or above some threshold of time accessing.

At block 206, the attribute identification component 152 builds a map of the user's attribute interests based on the analysis of the explicit and/or implicit behavioral cues. Data representing individual attributes in which the attribute identification component 152 determined the user's behavior indicated an interest may be merged together into a larger set of data, which can be stored as a map, table(s), or other data type(s). For convenience, the remainder of this specification will refer to the set of data as being stored as a map, although other data types may be used.

Optionally, at block 208, the attribute identification component 152 may adjust the attribute interest data in the map to obtain a more helpful map of the user's interests. In one embodiment, the attribute interest data may be adjusted based on item categories. For example, a set of attributes may pertain to one or more category of items browsed by the user but not to other categories, and the user's attribute interest data may be adjusted to reflect this limitation. To illustrate, the user's behavioral data may indicate interest in attributes such as "16 megapixels," "low light performance," and "space travel." The attribute identification component 152 may determine that the attributes "16 megapixels" and "low light performance" are relevant to the category of digital cameras, while the attribute "space travel" is relevant to one or more categories of books, audiobooks, television shows, and movies. The map of the user's attribute interests may be structured in a manner that reflects the item categories relevant to the attributes of interest.

However, the attribute identification component 152 can take into account items from related categories when evaluating user interests. For instance, items in an example digital single-lens reflex (SLR) category may have overlapping attributes with items in a point-and-shoot digital camera category. Thus, a user's browsing activity from related categories might be counted toward indication of interest in the same or related attributes, while a user's browsing activity from unrelated categories might not. An example of unrelated categories with potentially overlapping attributes includes a category of laptop computers and BBQ grills. Both laptops and grills might have the attribute "portability" (as with light laptops and small grills), but a user's interest in portable laptops may not indicate a corresponding interest in portable grills. The electronic catalog data stored in the item data repository 160 can indicate which categories are related. For example, a hierarchical browse tree in the electronic catalog can include metadata markers on certain non-leaf node categories (such as a "cameras" category) that indicate whether behavioral data representing attribute interests from lower-level categories (such as a "digital SLRs" category and a "point and shoot" category) may be combined.

In another embodiment, the attribute identification component 152 may attenuate or otherwise adjust the attribute interest data in the map based on time. For example, a user's behavioral data from two years past may indicate interest in the attribute "8 megapixels," while more recent behavioral data indicates an interest in "16 megapixels." The attribute identification component 152 may filter out the older behavioral data so that the user's attribute interest map primarily or only reflects the current interest in "16 megapixels." For example, the attribute identification component 152 can exponentially or linearly weight items to have lower weight as time passes. Further, the attribute identification component may make determinations about which attributes are of what importance to the user, and may rank the attributes in terms of importance. For example, the user's behavioral data may indicate an interest in both of the attributes "low light performance" and "battery life" with respect to digital cameras. The attribute identification component 152 may determine based on a variety of factors that "low light performance" is more important to the user than "battery life" (or vice versa). For example, the attribute identification component 152 can assign attributes for which more behavioral data exists with respect to a user with a higher rank than other attributes. A user may have viewed more cameras with low light performance as an attribute than cameras with long battery life as an attribute, for instance, and the attribute identification component 152 may therefore rank the low light performance as the more important attribute to the user.

Certain embodiments may optionally assign rankings to a plurality of attributes of interest. The attribute identification component 152 may employ a variety of techniques to rank the relative levels of interest a user displays in a plurality of attributes, and in some embodiments this attribute ranking data may be used by the review presentation component 154 to sort item reviews for presentation to the user. Both implicit and explicit cues in a user's browsing behavior may be used to determine relative levels of interest. In some embodiments, the length of time a user spends viewing reviews associated with an item attribute may indicate the user's level of interest in the attribute. For example, a user may spend more time viewing reviews which discuss a first attribute versus time spent viewing reviews discussing a second attribute, and the attribute identification component 152 may determine that the user has a greater level of interest in the first attribute. Other embodiments may determine relative attribute interest levels based on a user's click stream. The click-stream data may incorporate a history of products viewed by and/or filtering options selected by a user. Attribute data associated with some or all of these products or filtering options may then be aggregated and used to determine the user's level of interest in those attributes. Such ranking is optional, however in certain embodiments ranking may be useful where a user expresses interest in more than one attribute to have data on the relative level of interest in each attribute.

At block 210, the attribute identification component 152 stores the map of data representing the user's attribute interests in association with the user (e.g., in association with a profile of the user). This attribute interest data may be stored in the user data repository 122 of FIG. 1. Later access to the stored attribute interest data may be beneficial for personalizing the reviews presented to the user and/or for eliciting detailed item reviews from the user. Many other uses, including providing personalized item recommendations based on the detected attribute interests of users, are possible from the user's attribute interest data.

IV. Review Presentation Overview

Figure 3:
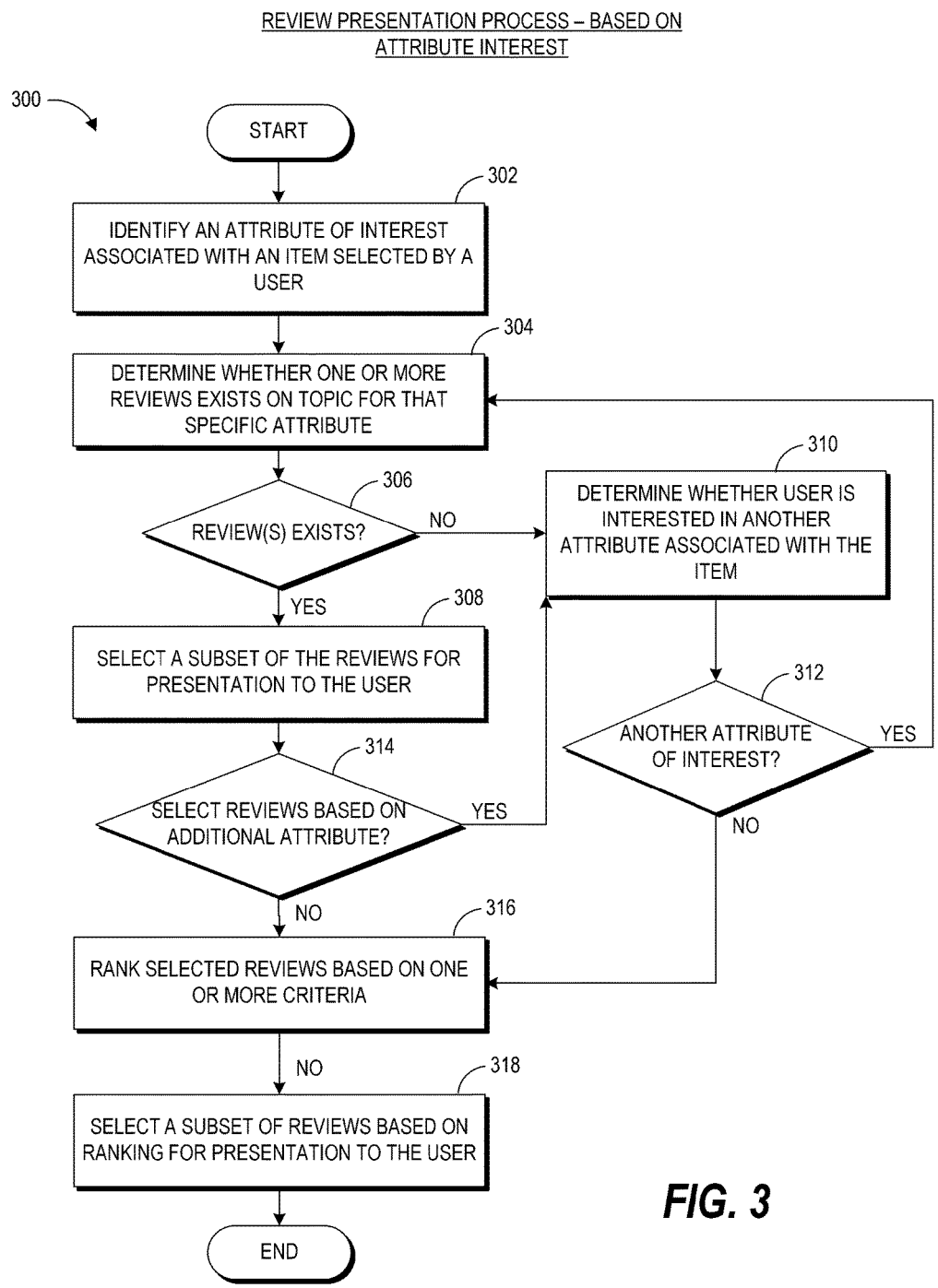
FIG. 3 illustrates an embodiment of a process for presenting user reviews.

FIG. 3 illustrates an embodiment of a review presentation process 300. When browsing items in an electronic catalog such as the catalog service 130 of FIG. 1, a user does not physically interact with the items in the catalog, so the reviews of an item written by users who own, purchased, or otherwise interacted with the item can provide helpful information to subsequent users. The review presentation process 300 can make use of attribute interest data associated with a user to present that user with helpful item reviews. While any computing system can implement the process 300, the process 300 is described as being implemented by the review presentation component 154 of FIG. 1.

The review presentation process 300 can be initiated in response to a user selecting an item to review. In addition, the review presentation process 300 can be initiated in response to a user requesting to view reviews on an item, for example, by selecting a review link on an item detail page that provides details about a particular item. In response to either the item selection by the user or direct request to view reviews, the process 300 can select and output user-interest targeted reviews for presentation to the user.

In block 302, the review presentation component 154 identifies an attribute of interest to a user which is also associated with an item selected by the user. The review presentation component 154 may access the stored user attribute interest data in the user data repository 122 to determine an attribute in which the user is interested. Data representing attributes associated with an item may be stored in the item data repository 160, as described above. By accessing both the attribute interest data and the item data, the review presentation component 154 can identify whether there is an attribute or attributes common to both sets of data.

Once a common attribute is identified, the review presentation component 154 determines, at blocks 304 and 306, whether one or more reviews exist on topic for that specific attribute. There may be a plurality of reviews for an item, of which a subset of the reviews may contain helpful information regarding an attribute in which the user is interested. The subset may be all the reviews in some instances. The review presentation component 154 may access the review data repository 170 to determine whether a specific attribute is discussed in each item review. As discussed above, a review may be searched by keywords pertaining to the attribute to determine whether that specific item attribute is discussed in the review. In other embodiments, the review data may have been indexed, and each review may contain tags or markers to indicate the attributes discussed therein. The review presentation component 154 may compare the review tags to the attribute of interest to determine whether the attribute is discussed in the review. In some embodiments, a review may also be associated with a specific attribute if the user who wrote the review was prompted to write about that item attribute during the review creation process. The review presentation component may use some or all of these methods to determine the attribute content of a review.

If one or more reviews are determined to exist on topic for the common attribute (block 306), the review presentation component 154, at block 308, can select a subset of those relevant reviews for presentation to the user. All reviews may be selected in embodiments in which the review presentation component 154 is configured to provide users with as much useful data as exists. In other embodiments, some reviews may be selected, for example where the review presentation component 154 is configured to select only as many relevant reviews as may fit within a certain area of a page displaying the reviewed item. In yet other embodiments, the review presentation component 154 may be configured to store data representing both the entire set of relevant reviews and a smaller subset of the relevant reviews. More generally, any subset of the relevant reviews may be selected for presentation to the user.

If no reviews are determined to exist on topic for the common attribute, the review presentation component 154, at blocks 310 and 312, may determine whether the user is interested in another attribute associated with the item. If an additional common attribute exists, the review presentation component 154 may analyze the item reviews for reviews relevant to the additional common attribute. If no additional common attribute is determined to exist, or if no reviews are found on topic to additional common attributes, then no reviews will be selected for output to the user, or alternatively, other reviews not related to the identified attribute are output to the user.

Even if there are reviews on topic for the common attribute, in some embodiments it may be useful for the review presentation component, at block 314, to select additional reviews based on one or more additional attributes of interest. Thus, the process 300 may be repeated for as many additional common attributes as the review creation component 154 is configured to look for, which may be two, three, or all that have been identified as interests of a user. Optionally, the reviews selected for presentation to the user may be limited to reviews which discuss all of the item attributes in which the user is interested. In other embodiments, it may be advantageous to present all reviews relevant to attributes of interest to the user. In still other embodiments, the attribute identifier 152 ranks attributes identified as potential interests of users and selects reviews for presentation to the user related to a most highly-ranked subset of the identified attributes.

The review set may optionally be sorted or ranked at block 316 before presentation to the user. As discussed above, in some embodiments the attribute interest identification component 152 may rank reviews based on a user's relative levels of interest in those attributes, and the reviews may be sorted based on a primary attribute of interest, secondary attribute of interest, ternary attribute of interest, and so forth. For example, a user's attribute interest data may have been ranked by the attribute identification component 152 to indicate a primary interest in "low light performance" and a secondary interest in "battery life," and the review presentation component 154 may have selected digital camera reviews based on both of these attributes. The selected low light performance reviews may be sorted by determining whether they also discuss battery life, so that the reviews likely to contain the most helpful information will be presented first to the user. In certain embodiments, reviews may be sorted based on criteria such as length, the grade level of the writing, a determination of the level of detail in the review, a helpfulness rating associated with the review (e.g., provided by users who rated the review as helpful or not helpful), the recency of the review, or by a combination of some or all of the criteria discussed herein. Some embodiments may not sort the reviews; however, sorting may provide the advantage of first presenting the most helpful reviews in a potentially large set of reviews, thereby reducing the amount of time it may take for a user to discover relevant attribute information helpful for evaluating the item.

In block 318, the review presentation component 154 selects a subset of the reviews based on ranking for presentation to the user. The reviews may be presented in a variety of ways, depending upon the user interface in which the reviews appear. Some user interfaces may present the reviews at the bottom of an item detail or description page underneath an image or images of the item, a description of the item, and/or the specifics of the item. The review presentation component 154 may be configured to first display a subset of the selected reviews, for example as many reviews as will fit on the item description webpage, but may provide the user with an option to view the entire set of relevant reviews. Optionally, the reviews may be trimmed to a set length with an option to expand and view the full review text. Certain embodiments of the review user interface may associate an item rating with each review, for example a binary, ternary, or 5-symbol rating system. Review association with such ratings may allow the user to select a subset of the reviews for presentation, for example all positive reviews or all negative reviews. The various embodiments of the review presentation component 154 discussed above enable users to be presented with helpful reviews relevant to specific item attributes.

Other embodiments of the review presentation component 154 may, in addition to outputting reviews, emphasize attribute-specific portions of review text to users. If a review selected for presentation to the user contains information on an attribute identified by the attribute identifier 152 as being of interest to the user, the portion of the review which is relevant to the attribute may be emphasized. A variety of emphasis techniques may be employed, for example highlighting, bolding, or underlining a relevant review portion, placing a border around the relevant portion, placing markers or tags at or near the relevant portion, changing the font color for the relevant portion, or a combination of some or all of these techniques. Other embodiments may present users with a popup window displaying text to alert users to attribute-specific review content. For example, the text may state "We noticed your interest in [attribute]. Here are some reviews which discuss that aspect of this [item]," and the review presentation component 154 can replace the text [attribute] with the actual attribute in which the user is interested, for example "low light performance," and can replace the text [item] with the type of item being reviewed, for example digital camera.

If multiple portions of a review discuss an attribute of interest, the review presentation component 154 may emphasize some or all of the multiple relevant portions. Further, if multiple review portions correspond to multiple attributes, the review presentation component 154 may employ a variety of emphasis techniques in order to distinguish between the multiple review portions based on their corresponding attributes. The review presentation component 154 may also emphasize portions of multiple reviews.

In another embodiment, the review presentation component 154 may aggregate review data to present generalized statements about item performance on an attribute to users. For example, if a large percentage of reviews indicate that an item such as a camera has good low light performance, then the review presentation component 154 may present a user viewing that item with a statement indicating that the camera performs well in low light situations. The statement may be in the form of a popup window, for example displaying text stating "Users say that this [item] has great [attribute] performance," and the review presentation component 154 can replace the text [attribute] with the actual attribute in which the user is interested, for example "low light performance," and can replace the text [item] with the type of item being reviewed, for example, a digital camera. Other embodiments may the statement in the form of a quote from a user review, and may include with the quote the number of reviewing users who agree with the quote. Certain embodiments may additionally display at least one item review describing the item's performance on the attribute. Portions of those reviews which are relevant to the attribute may be emphasized. Aggregating attribute-specific review data advantageously provides users with helpful information about item performance, as users are not able to physically interact with items in the electronic catalog. Further, the aggregate attribute data may provide users with helpful information which the users may not otherwise be able to discover, for example by presenting a statement saying "Ten out of twelve reviewing users say that this size large fits like a size small," or "Ten out twelve reviewing users think the color of this item is darker than the photo."

In another embodiment, user reviews are searchable by the search engine 140 and may appear in search results in response to user keyword searches (e.g., together with data representing an item). The search engine 140 may provide a separate search box for review queries in addition to normal queries. Thus, in one embodiment, the search engine 140 provides two search (text) boxes—one that users can employ to search for items and another that users can employ to search reviews. That way, a user can search for a particular item, such as a digital camera, with a desired attribute (or "not" an attribute in a Boolean sense) such as "long battery life" as expressed in user reviews. This functionality can be provided in a single text box using a special keyword, such as "review(*)" or the like, where the * in the parentheses denotes the text to search in reviews. For example, a user conducting the above digital camera query might search for '"digital camera" and review ("long battery life")' in a single search box.

Attribute-specific reviews can advantageously facilitate targeted search results in certain embodiments because tagging reviews with attribute metadata can enable the search engine 140 to use this attribute information as a clue as to what concepts a customer review covers. The search engine 140 can treat this information about what is covered in a review with greater weight or confidence than concepts mined from freeform reviews, due to the attribute metadata. Thus, the search engine 140 may be able to provide more interesting or relevant search results to users who search attribute-tagged reviews.

V. Review Creation Overview

Figure 4A:
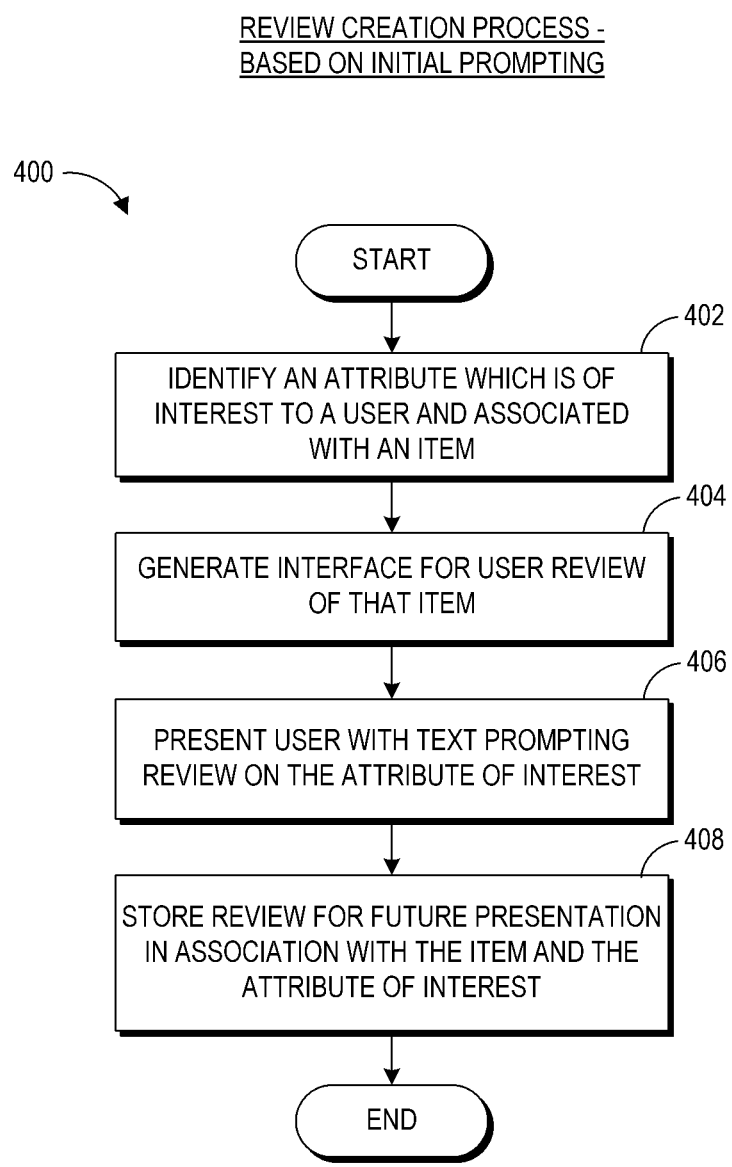
FIGS. 4A and 4B illustrate some embodiments of processes for developing user reviews.
Figure 4B:
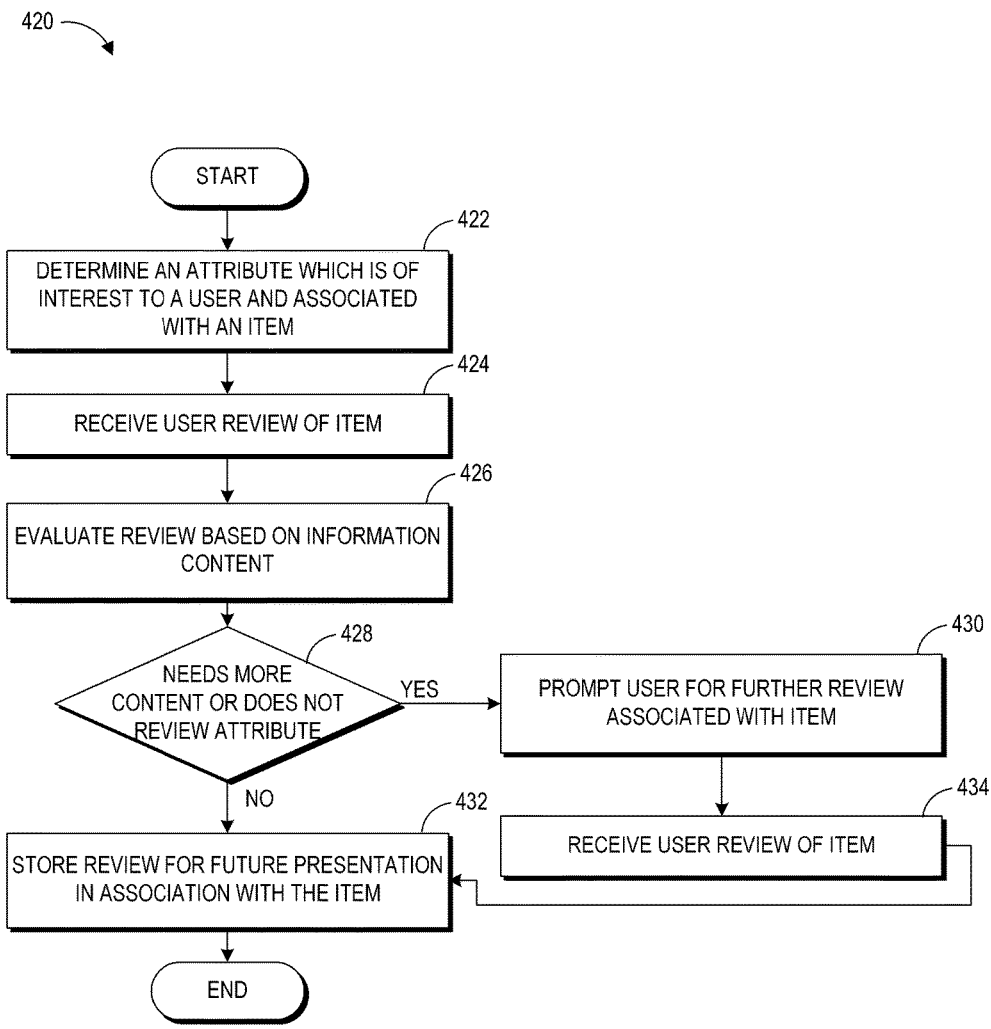

FIGS. 4A and 4B illustrate embodiments of processes 400, 420 for selecting review questions, depicting some example criteria that may be used to select review questions. For ease of illustration, these processes will be described in the context of the interactive computing system 110, and in particular, the review creation component 156.

Referring specifically to FIG. 4A, the process 400 can aid the user in creating an item review by prompting the user to review a specific attribute. As described above with respect to FIG. 1, the interactive computing system 110 includes an item data repository 160 that can store information about electronic catalog content, including data representing attributes associated with items in the catalog. This data may include information on the attributes of each item in the catalog as well as how each item in the catalog performs on a specific set of attributes. The interactive computing system 110 also includes a user data repository 122 that can store data representing user attributes interest. The review creation component 156 can access the item attribute data in the item data repository 160 and the user attribute interest data in the user data repository 122.

At block 402 of the process 400, the review creation component 156 identifies an attribute which is common to both the user attribute interest data for a user reviewing an item as well as the item attribute data for the item being reviewed. The review creation component 156 may identify the common attribute in response to a user request to review an item. This user request may come in many forms, one example of which is a user selecting a "review this item" link or the like provided by a user interface of the interactive computing system 110. A user-selectable link (or other user interface control) to review an item may be provided on an item detail page or user interface associated with an item.

In another scenario, the review creation component 156 identifies a common attribute without first receiving a user request to review an item. Many users that purchase or otherwise access items do not review them soon after purchase. In such situations, the interactive computing system 110 may send an email, text message, or other electronic message to a user that invites him or her to review the item. The review creation component 156 may populate this email with questions about at least one common attribute, selecting the common attribute(s) before ever receiving an indication from the user that the user will write a review. Advantageously, in such embodiments, the questions about item attributes in which the user indicated an interest may spark some users' interest in creating a review and thereby cause more users to write reviews. Examples might include a "low light performance" attribute for a camera, an "actor" attribute for a movie (e.g., leading to a question such as "What did you think of this actor?"), and so forth. Encouraging the user to focus on this attribute may be helpful in eliciting a review as well as developing a more detailed review. For example, because the user's behavior indicated an interest in "low light performance" of cameras, the user is likely to have evaluated the low light performance of the camera they are reviewing prior to commencing the review process, and may be able to provide detailed, helpful feedback on that attribute.

The review creation component 156 generates a user interface for item review at block 404. This review user interface may, in some embodiments, be a text box. In other embodiments, the review user interface may provide functionality for a user to upload an audio and/or video review instead of or in addition to entering text in a text box. The user interface may also include options to provide an overall rating for an item or to rate multiple aspects of the item, for example an option to rate the performance of any item attribute of interest to the reviewing user. In the context of cameras, for example, ratings might be provided for the camera's low light performance and battery life, where the user attribute data indicates an interest in those attributes. The rating can be a binary rating (e.g., positive or negative), ternary rating (positive, negative, and neutral), or a numerical rating system such as a 5-symbol rating.

At block 406, the review creation component populates the review user interface with a dynamically generated statement and/or question prompting the user to discuss an item attribute which was determined to be of interest to the user at block 402. As an example, the user interface may display the statement and question "We noticed you were interested in [attribute]. How would you say this [item] performs on that attribute?" The review creation component 156 can replace the text [attribute] with the actual attribute in which the user is interested, for example "low light performance," and can replace the text [item] with the type of item being reviewed, for example digital camera. This statement and/or question may be displayed above, below, or even within a review text box. Some embodiments may display the question together with a rating component. Certain embodiments may generate a statement and/or question for more than one common attribute to elicit detailed feedback on multiple item attributes. Some or all statements and/or questions may be presented together with a rating component and/or a text box in which a user can input text of an answer. The multiple statements and/or questions may be alternatively presented together above, below, or within one text box. In some embodiments, an attribute-specific statement and/or question may be displayed to the user prior to presenting the review user interface to elicit an item review from the user.

The review creation component 156, at block 408, stores the review response in the review data repository 170 in association with the item and attribute or attributes reviewed for later presentation as part of a user review. The review response is may be indexed or stored together with data or tags representing the attribute or attributes reviewed. Subsequently, when another user accesses an item detail page describing the reviewed item, the review presentation component 154 can output the review created by the user. The review presentation component 154 can output the attribute reviewed and the review response or just the review response.

For instance, turning to FIG. 4B, another embodiment of a process 420 is shown that illustrates different timing for prompting a user to review an item's performance on a specific attribute.

At block 422 of the process 420, the review creation component 156 identifies an attribute which is common to both the user attribute interest data for a user reviewing an item as well as the item attribute data for the item being reviewed. The review creation component 156 may identify the common attribute either prior to or in response to receiving a user review of an item.

At block 424 the review creation component receives a user review of an item, and at 426 this review is evaluated base in its information content. A variety of criteria may be used to evaluate the content of a review. For example, if the length of the review is determined to be shorter than a specified length, this may indicate that the review content lacks sufficient detail for subsequent presentation of the review to users to be helpful. Length may be judged based on character count or word count. Certain embodiments may determine the grade level of the writing in the review, and a low grade level may indicate that the review content lacks sufficient detail. It may be advantageous in some embodiments to evaluate the review based on whether it describes the common attribute. Other embodiments may employ grammar checking, word variety analysis, or a combination of any or all of the criteria described above to determine the adequacy of a review's information content. Review evaluation may be performed at any time after submission of the review, including immediately thereafter, or may be performed simultaneously with the user's writing of the review text.

If it is determined at block 428 that the review could benefit from further development of its information content, the review creator 156 may prompt the user at block 430 for further review associated with the item. For example, the review creator 156 may determine that the review does not address any attributes identified as interesting to the user about the item under review. The review creator 156 may present the further review prompt to the user on a new screen or popup message following review submission. The further review prompt can, in some embodiments, be presented to the user by the interactive computing system 110 in the form of a popup message, text box, an email, text message, or other electronic message that invites him or her to add to the submitted item review. The review creation component 156 may populate the further review prompt with questions about at least one item attribute in which the user is interested. Advantageously, in such embodiments, the questions about such item attributes may spark some users' interest in developing the content of the review and thereby cause the user to write additional review material. Examples might include a "low light performance" attribute for a camera, a "space travel" attribute for a movie, and so forth. Encouraging the user to focus on an interesting attribute may be helpful in developing a more detailed review.

In some embodiments, the subsequent user review may optionally be evaluated for the adequacy of its information content, and the user may be prompted more than one time to provide additional item feedback in order to develop a sufficiently detailed review. However, other embodiments may decline to perform an evaluation of a secondary review for a variety of reasons. For example, a subsequent inadequate review may indicate that the reviewing user does not wish to take the time write a detailed review, and the reviewing user may not appreciate being prompted multiple times to provide additional feedback.

At block 432, after receipt of the subsequent user review at block 434 or if the initial review content is evaluated as having sufficient detail at block 428, the review creation component 156 stores the review response in the review data repository 170 in association with the item and attribute or attributes reviewed for later presentation as part of a user review. As described above, in response to other users subsequently accessing an item detail page describing the reviewed item, the review presentation component 154 can output the review. The review may also be searchable by the search engine 140 in some embodiments and may appear in response to user keyword searches relating to the item or attribute reviewed.

In addition to storing reviews for subsequent presentation to users, the review creation component 156 can also mine the text of user reviews to obtain metadata about reviews. Advantageously, in certain embodiments, the semantic structure of attribute-specific reviews can be easier to parse and apply natural language processing (NLP) techniques to due to the question and answer format. Thus, for example, a question like "What is the battery life of this device like?" might elicit responses that are more computationally feasible to analyze in terms of a device's battery life than mining that same information from a freeform review. Some answers may be particularly easy to parse and analyze if they are provided using checkboxes, radio buttons, or other similar user interface controls that may not allow freeform text input.

The review creation component 156 can present this metadata about reviews to users and/or item vendors. In one embodiment, the review creation component 156 performs statistical analysis on the metadata and presents this statistical analysis or information to users and/or item vendors. An example of such statistical analysis might be calculating the percentage of users who express some sentiment or characteristic about an item, or calculating the mean or other statistic of users who express some sentiment or characteristic about an item. For instance, the review creation component 156 might calculate that 75% of users mention long battery life for a digital camera and might output on an item detail page together with reviews of an item that "3 out of 4 users say that this device has long battery life." The review creation component 156 can also use this statistical analysis as a factor in attribute selection for future reviews. If many users are expressing a certain characteristic or sentiment about an item attribute, the review creation component 156 can ask subsequent reviewers what they think about that attribute or sentiment.

Another potential use of attribute-specific reviews is to determine consumer sentiment about different items and provide this information to vendors. For instance, in the digital camera context, a provider of the interactive computing system 110 might poll attribute-specific reviews to determine consumer sentiment regarding camera low light performance and may use this information to determine which digital cameras to stock or sell.

VI. Example User Interfaces

Figure 5:
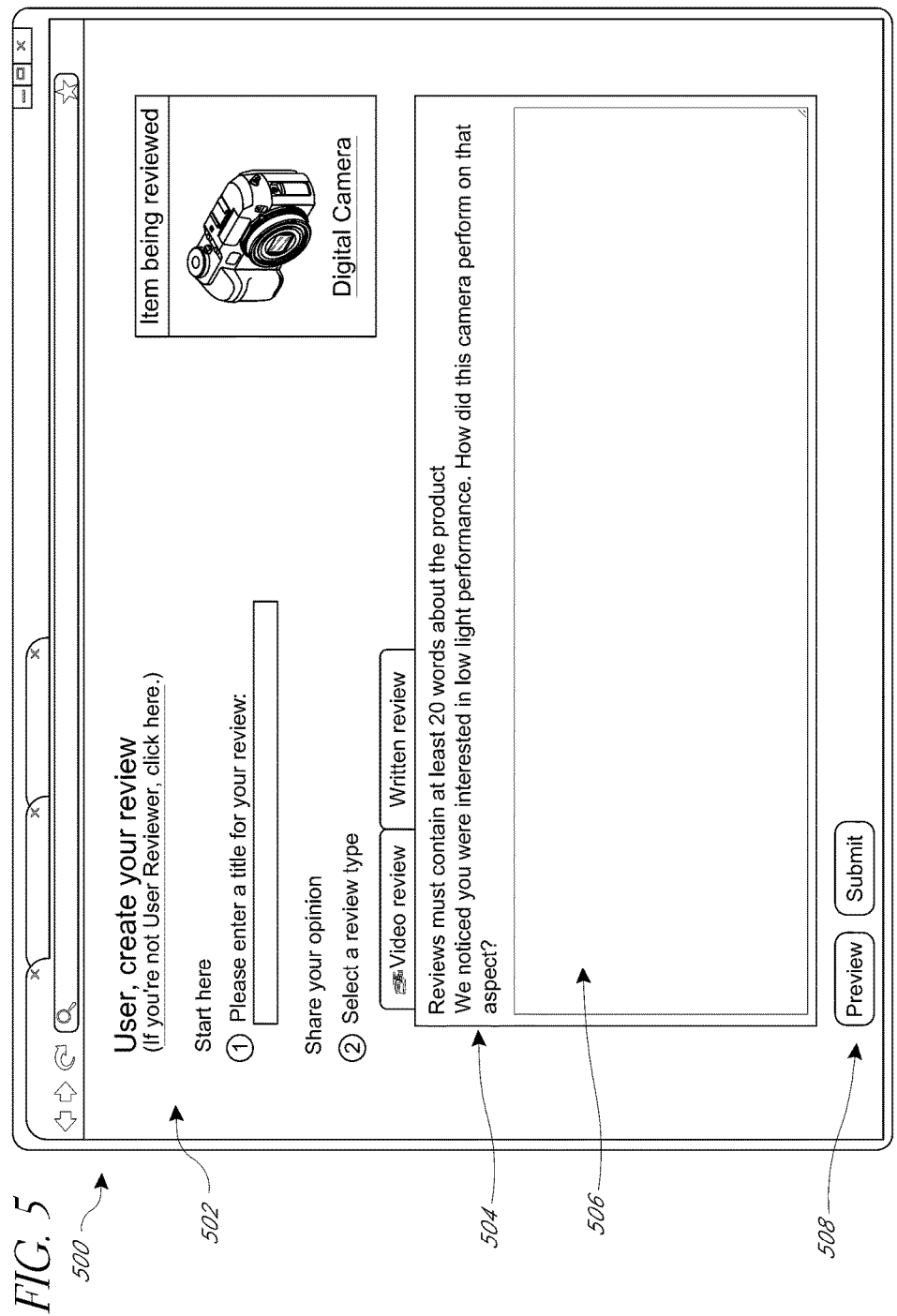
FIG. 5 illustrates an example of a graphical user interface for presenting review creation components to users.

FIG. 5 illustrates an example user review interface 500 for presenting item attributes to users during the review process in the context of digital cameras. The user interface 500 is implemented in a web browser for illustrative purposes. As discussed above, a similar user interface could be implemented in a mobile application accessible by a phone or tablet or the like.

The guided review user interface 500 includes a review form 502 for providing a detailed review of an item. The review form 502 includes a dynamically selected guiding statement 504, a review text box 506, and controls 508 for submitting the review. In one embodiment, the statement 504 suggests to the user a specific attribute for discussion in the item review. Although one question for one attribute is shown, in other embodiments statement 504 may include multiple questions about the attribute and/or questions about multiple attributes. The statement 504 may be generated by the review creation component 156 determining an intersection between user attribute interest data stored in the user data repository 122 and item attribute data stored in the item data repository 160, as described above.

Figure 6:
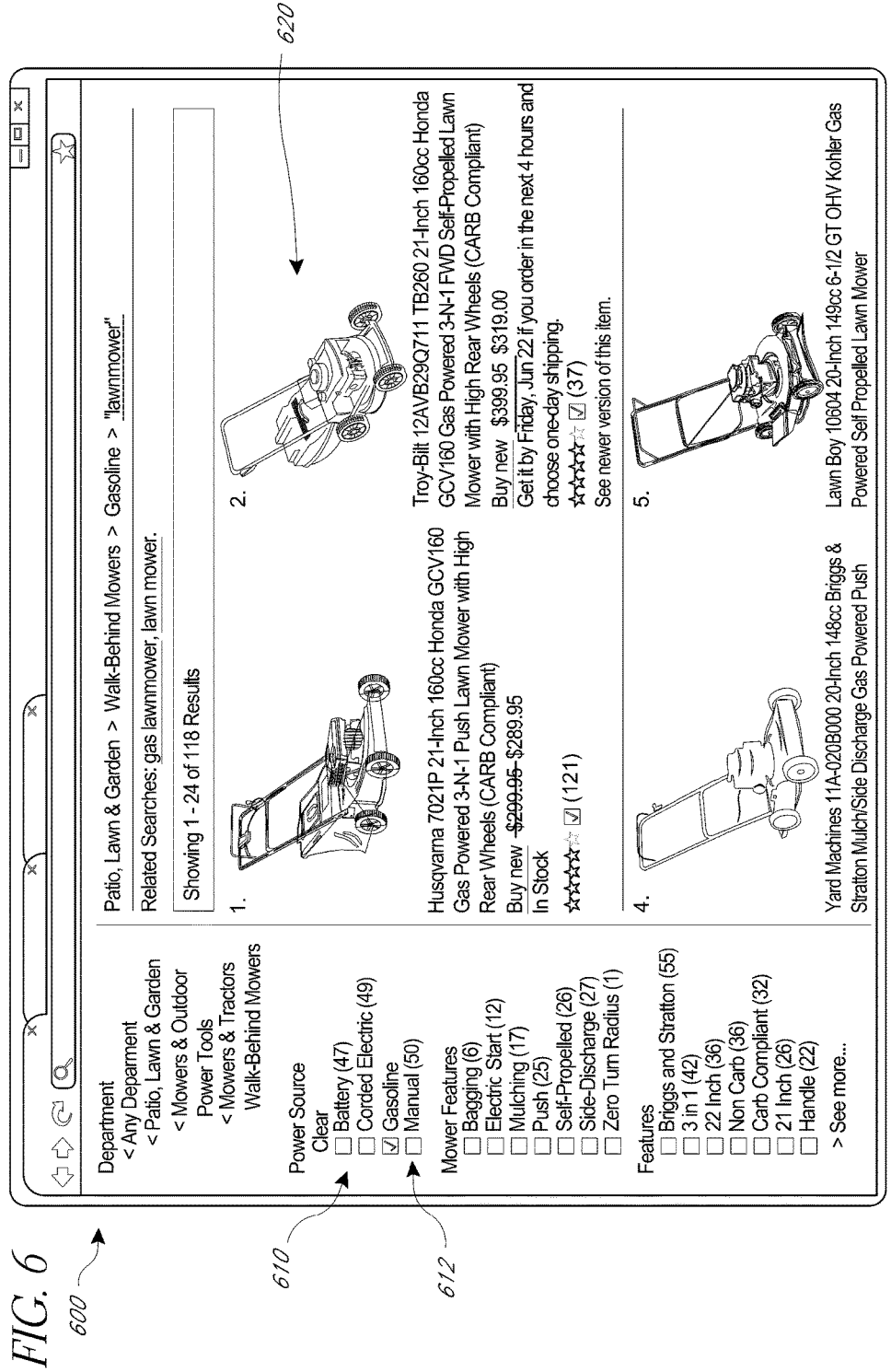
FIG. 6 illustrates an example of a graphical user interface that enables a user to browse for items based on item features.

FIG. 6 illustrates an example browse user interface 600 that depicts example results of browsing an electronic catalog for information about lawn mowers. Various browse results 620 depicting lawn mowers are shown in the user interface 600. The browse results 620 may have been reached by a user browsing categories of the electronic catalog or by conducting a keyword search. To the left of the browse results 620 are shown various browse refinement features 610. These browse refinement features 610 allow a user to filter the list of browse results 620 based on features or attributes of the items in the browse results 620. For example, in the depicted embodiment, the browse refinement features 610 include checkboxes 612 that enable a user to select features related to mower power sources and other mower features.

As described above, the attribute identifier 152 of FIG. 1 can track a user's interactions with an electronic catalog to identify attribute interests of the user. Advantageously, in certain embodiments, the attribute identifier 152 can track user selections of browse refinement features such as those shown (610) in FIG. 6. User selection of browse refinement features can be explicit cues as to which item attributes a user may be interested in.

Figure 7:
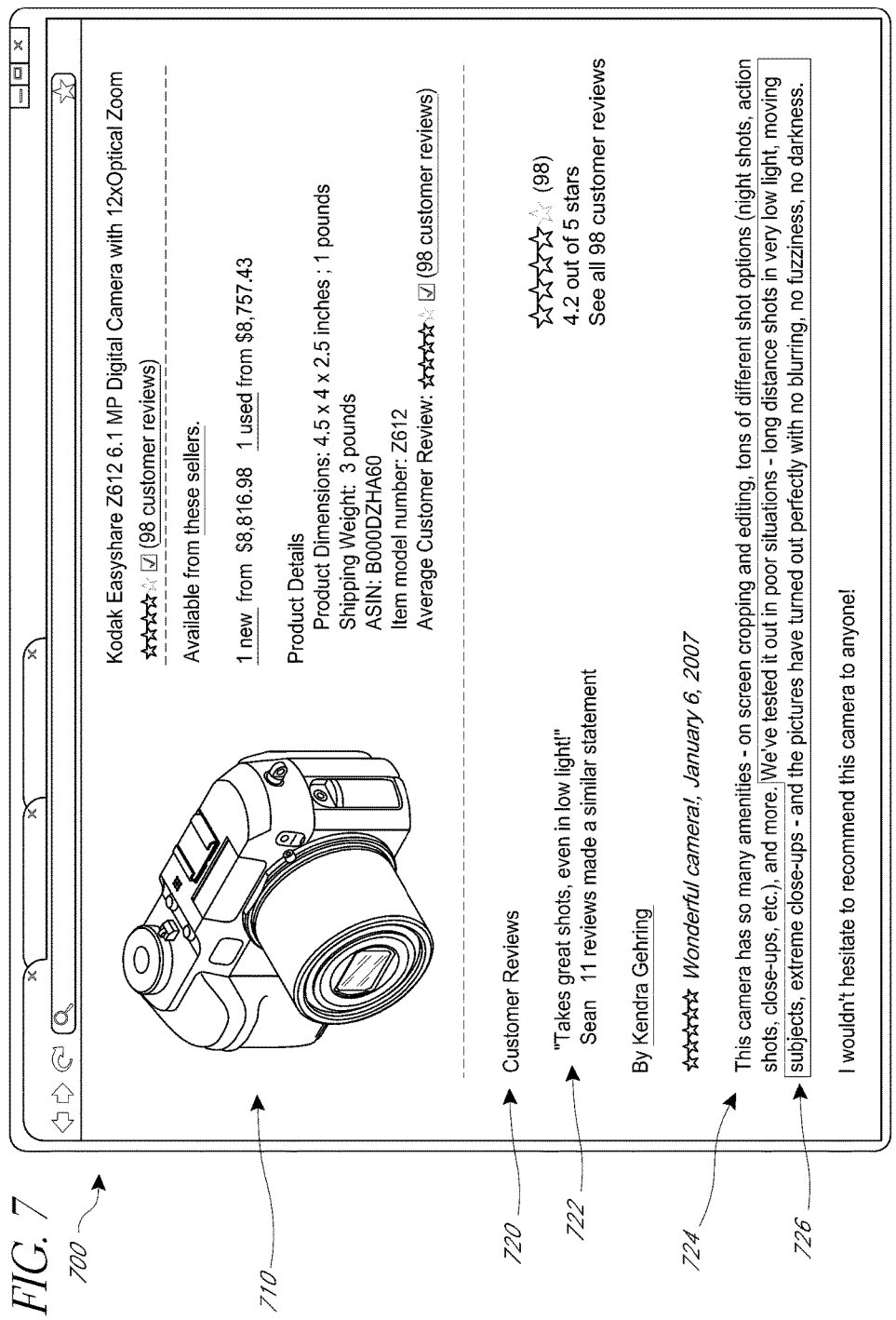
FIG. 7 illustrates an example review presentation interface 700 that depicts one embodiment of emphasizing attribute-specific review text to users.

FIG. 7 illustrates an example review presentation interface 700 that depicts one embodiment of emphasizing attribute-specific review text to users. An item description 710 depicting a camera and product details is displayed in the review presentation interface 700. The item description 710 may have been presented to the user in response to a user selecting the item from search results, selecting the item after recommendation, or clicking a hyperlink directed to the item. The item description 710 is displayed as part of an item detail page but could alternatively be displayed as a list of multiple item descriptions. Below the item description 710 is a customer review section 720 which displays personalized item review information to the user. The customer review section 720 includes an attribute review overview 722, which presents aggregated data on an item attribute of interest to the user in the form of a statement about the item's performance with respect to that attribute. Certain embodiments may display a quote from a user review, as illustrated, accompanied by the number of other user reviews which agree with the quote.

The customer review section also contains a review of the item 724 selected by the review presentation component 154. A portion of the review text may be emphasized 726 to the user based on that portion discussing an attribute identified by the attribute identifier 152. The emphasized portion 726 can advantageously bring to the user's attention the portion of the review which is likely to contain information helpful to the user. The embodiment illustrated emphasizes the text portion using a box around the text portion, however other embodiments may employ other means of emphasis, for example bolding or highlighting.

Although the attribute review overview 722 and the review 724 are displayed together, in some embodiments of the review presentation interface 700 these components may be presented to users individually. Further, although only one review is shown with one attribute review overview, certain embodiments may display more than one review and/or more than one attribute review overview. Other embodiments may highlight text in multiple places within a review.

VII. Additional Embodiments

As described above with respect to FIG. 1, the attribute identification component 152 can identify specific item attributes in which a user displays interest. This data may be used to recommend additional items to the user. A recommendation service (not illustrated) within the interactive computing system 110 may access user attribute interest data stored in the user data repository 122 and may also access data representing information about electronic catalog content stored in an item data repository 160. As described above, data representing attributes associated with items in the catalog may be stored in the item data repository 160. By accessing both the attribute interest data and the item attribute data, in certain embodiments the recommendation service can generate a list of items which are associated with attributes of interest to the user. Some embodiments may also access data representing aggregated user reviews of item attribute performance in the review data repository 170. Alternatively, the attribute performance data may be stored in association with items in the item data repository 160. This data may be used to generate a list of items which perform well on the attributes of interest to the user. The recommendation service may output some or all of these items into a user interface for presentation to the user. Certain embodiments may accompany the items presented to the user with a dynamically generated statement. As an example, in the statement "We noticed you were interested in [attribute], so here are some items you may be interested in," the recommendation service can replace the text [attribute] with the actual attribute in which the user is interested. These and other embodiments may be used to present users with items relevant to the users' attribute interests.

Further, in some embodiments, the review presentation component 154 (see FIG. 1) outputs a representation of one or more reviews that relate to an attribute of interest to a user. The representation can be the reviews themselves, some summary of the reviews, or the reviews together with metadata or other indications about the reviews. For instance, the summary of the reviews could include an indication on the item detail page regarding a number of users that commented on an identified attribute of interest to a user in their reviews. This summary might be phrased as follows "Nine out of 10 reviewers think this camera has good low-light performance" or the like, as described above. The metadata included in the representation of some reviews can include highlighting of relevant portions of a review that references an attribute, drawn boxes around the relevant portions of a review that references an attribute (see FIG. 7), tags or text that indicates that a review is about an attribute (e.g., above, on the side, or below a review), combinations of the same, or the like.

Moreover, in some embodiments, attribute metadata associated with items can indicate a degree to which an item possesses an attribute, rather than a binary indication of whether the item possesses the attribute or not. This degree can be represented on a numerical scale or some other appropriate scale. As an example, if an item is a laptop computer, one attribute associated with the laptop might be portability. As this attribute can be subjective, laptops may be assigned a degree to which they are portable. Laptops with lower weight, for example, may be assigned a score that represents better portability than heavier laptops. This portability score can be assigned by a representative of the interaction computing system 110, a vendor of the laptop, or by reviewers themselves. For example, the review presentation component 154 may output a user interface control that enables users to rate the degree to which an item possesses an attribute. In the laptop example, the review presentation component 154 might ask users to rate a laptop as highly portable, somewhat portable, or not portable, or alternatively, a five-star rating (or the like) representing the portability of the laptop. Other examples of items that may have attributes representable in degrees include articles of clothing (e.g., size, such as whether a particular "large" shirt really is a large), food (including, e.g., attributes such as taste, sweetness, bitterness, and so forth), movies (e.g., such attributes as family-friendliness, scariness, etc.), and electronics (e.g., attributes such as user-friendliness and portability), among many others.

VIII. Conclusion

Many embodiments of systems and processes have been described for generating user attribute interest data and using that data to present and/or develop reviews of items. Among many other features described herein, these systems and processes can dynamically collect data on a user's interest in specific item attributes, and can store this data in association with the user. The systems and processes can also make use of that data to provide the user with a personalized set of reviews which will provide the user with information relevant to interesting item attributes. Further, these systems and processes can make use of the user data to display a set of dynamically generated statements and/or questions that prompt the user to write an item review on specific item attributes. Moreover, the systems and processes may make use of the user attribute interest data to recommend items associated with the user's attribute preferences to the user.

IX. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Further, the headings used herein should not be used to limit the scope of the claims, as they merely illustrate example embodiments.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in physical computer hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of obtaining behavior-based review feedback, the method comprising:
   programmatically identifying an interest of a first user in an attribute associated with a plurality of items represented in an electronic catalog by analyzing behavior of the first user with respect to the electronic catalog;
   outputting a review creation user interface that provides functionality for the first user to create a review of a selected one of the items, wherein the review creation user interface prompts the first user to provide feedback about the attribute;
   storing a response input by the user as a review in association with the selected item in physical computer storage;
   receiving a request from a second user to view information about the selected item;
   determining whether the second user is interested in the attribute based at least partly on:
      identifying explicit attribute interest cues from behavioral data associated with the second user, the behavioral data representing behavior of the second user with respect to the electronic catalog and the explicit attribute interest cues comprising detected user behavior with respect to the review created by the first user, the detected user behavior indicative of the second user manifesting interest in the attribute,
      building a map of the attribute interests of the second user based at least partly on analyzing the explicit attribute interest cues and based at least partly on adjusting data representing the attribute interests based on one or more of item category, time, and ranking of the attribute interests, and
      determining whether the map of the attribute interests includes the attribute;
   in response to determining that the second user is interested in the attribute, selecting a set of reviews including the review of the first user for output to the second user in a review presentation user interface, wherein the set of reviews is sorted based at least partly on the attribute so that the review of the first user that mentions the attribute is presented before other reviews that do not mention the attribute;
   determining that at least two reviews of the set of reviews indicate a quality of performance of the selected item with respect to the attribute; and
   outputting an indication to the user that at least two users agree regarding the quality of the performance of the selected item with respect to the attribute;
   wherein at least said selecting the set of reviews to output for presentation to the second user is implemented by a computer system comprising computer hardware.

2. The method of claim 1, wherein said programmatically identifying the interest of the first user in the attribute further comprises identifying an action of the first user that explicitly indicates an interest in the attribute.

3. The method of claim 1, wherein said programmatically identifying the interest of the first user in the attribute further comprises identifying an action of the first user that implicitly indicates an interest in the attribute.

4. The method of claim 1, wherein outputting an indication to the user that the at least two users agree regarding the quality of the performance of the selected item with respect to the attribute comprises:
   selecting a quote from one of the at least two reviews relating to the performance of the selected item with respect to the attribute; and
   outputting the quote with a number indicating that the at least two users agree.

5. The method of claim 1, wherein determining that at least two reviews of the set of reviews indicate a quality of performance of that the selected item performs well with respect to the attribute comprises:
   identifying that the at least two reviews mention the attribute; and
   identifying that the at least two reviews specify the same quality of performance with respect to the attribute.

6. Non-transitory physical computer storage comprising instructions stored thereon that, when executed by one or more processors, are configured to implement a system for providing behavior-based review feedback, the system comprising:
   an attribute identifier configured to at least:
      track interactions of a user with respect to an electronic catalog of items,
      identify explicit attribute interest cues from the tracked interactions by at least analyzing a selection by the user of a subset of the items, the explicit attribute interest cues comprising detected user behavior with respect to a first review created by another user, the first review mentioning an attribute, the detected user behavior indicative of the user manifesting interest in the attribute, and
      identify, based on the explicit attribute interest cues, the interest of the user in the attribute, the attribute associated with the subset of the items in the electronic catalog; and
   a review presentation component configured to at least:
      receive a request from the user to view information about a selected one of the items in the electronic catalog,
      identify whether the selected item is associated with the attribute identified as being an interest of the user,
      in response to an identification that the selected item is associated with the attribute, identify a second review that is associated with the selected item and that relates to the attribute;
      output a representation of the second review, in a set of reviews relating to the item, for presentation to the user, the set of reviews sorted based at least partly on the attribute so that the second review is presented before other reviews that do not mention the attribute;
      determine that at least two reviews of the set of reviews indicate a quality of performance of the selected item with respect to the attribute; and
      output an indication to the user that at least two users agree regarding the quality of the performance of the selected item with respect to the attribute.

7. The non-transitory physical computer storage of claim 6, wherein the review presentation component is further configured to output the second review for presentation to the user together with an indication that the review is about the attribute.

8. The non-transitory physical computer storage of claim 6, wherein the review presentation component is further configured to determine whether the item to be reviewed by the user is one of the subset of items that possesses the attribute by at least accessing metadata associated with the item to be reviewed.

9. The non-transitory physical computer storage of claim 8, wherein the metadata indicates a degree to which the item to be reviewed possesses the attribute.

10. The non-transitory physical computer storage of claim 6, wherein the review presentation component is further configured to output the representation of the set of reviews for presentation to the user by outputting the set of reviews for presentation to the user.

11. The non-transitory physical computer storage of claim 10, wherein the review presentation component is further configured to perform one or more of the following: highlight a portion of the set of reviews that relates to the attribute, or output text together with the set of reviews that indicates that the set of reviews address the attribute.

12. The non-transitory physical computer storage of claim 6, wherein the review presentation component is further configured to output the representation of the set of reviews for presentation to the user by outputting a summary of the set of reviews for presentation to the user.

13. The non-transitory physical computer storage of claim 12, wherein the summary of the set of reviews comprises an indication of a number of reviewers who reviewed the attribute.

14. The non-transitory physical computer storage of claim 6, wherein the system further comprises a search engine configured to provide functionality for searching the second review based on the attribute associated with the second review.

15. The non-transitory physical computer storage of claim 6, wherein the system further comprises a recommendation component configured to present a recommendation to the user based on the attributed identified as an interest of the user.

16. A system for obtaining behavior-based review feedback, the system comprising:
   an interactive computing system comprising one or more processors configured to implement a review service, the review service comprising:
      an attribute identification component configured to at least:
         analyze interactions of a first user with respect to an electronic catalog of items,
         identify an interest of the first user in an attribute of a subset of the items of the electronic catalog by at least analyzing the interactions of the first user with respect to the electronic catalog,
         analyze interactions of a second user with respect to the electronic catalog,
         identify, based on the analyzed interaction of the second user, explicit attribute interest cues representing interest of the second user in one or more attributes, the explicit attribute interest cues comprising detected user behavior with respect to a review created by the first user, the first review mentioning the attribute, the detected user behavior indicative of the second user manifesting interest in the attribute,
         build a map of data representing the interest of the second user in one or more attributes based at least partly on analyzing the explicit attribute interest cues and optionally on adjusting data representing the attribute interests based on one or more of item category, time, and ranking of the one or more attributes, and
         identify an interest of the second user in the attribute by determining whether the map includes the attribute;
      a review creation component configured to at least provide functionality for the first user to create the review of a selected item of the subset of the items, wherein the review creation user interface prompts the first user to provide feedback about the attribute; and
      a review presentation component configured to at least:
         output a set of reviews for presentation to the second user, wherein the review presentation component sorts the set of reviews based at least partly on the attribute so that reviews that mention the attribute are presented before other reviews that do not mention the attribute;
         determine that at least two reviews of the set of reviews indicate a quality of performance of the selected item with respect to the attribute; and
         output an indication to the user that at least two users agree regarding the quality of the performance of the selected item with respect to the attribute.

17. The system of claim 16, wherein the review presentation component is further configured to at least receive a request from the second user to view information about the selected item.

18. The system of claim 17, wherein the review presentation component is further configured to at least receive an indication of the interest of the second user in the attribute.

19. The system of claim 18, wherein the review presentation component is further configured to at least identify that the selected item is associated with the attribute.

20. The system of claim 19, wherein the review presentation component is further configured to at least:
   identify that the review associated with the selected item relates to the attribute; and
   output the review based at least partly on the indication of the interest of the second user in the attribute and at least partly on identifying that the review associated with the selected item relates to the attribute.

21. The system of claim 16, wherein the review presentation component is further configured to at least receive an indication of the interest of the second user in the attribute and output the review based at least partly on the indication of the interest of the second user in the attribute.

22. The system of claim 16, wherein the review presentation component is further configured to at least sort the set of reviews based at least partly on the attribute.

23. The system of claim 22, wherein, based at least partly on analyzing the interactions of the second user with respect to the electronic catalog, the attribute identification component is further configured to at least:
   identify an additional interest of the second user in an additional attribute;
   identify relative levels of interest of the second user in the attribute and the additional attribute; and
   based at least partly on the relative levels of interest of the second user, identify the attribute as a primary attribute of interest to the second user and identify the additional attribute as a secondary attribute of interest to the second user.

24. The system of claim 23, wherein the review presentation component is further configured to at least sort the set of reviews based at least partly on the primary attribute and at least partly on the secondary attribute.

25. The system of claim 16, wherein the review creation component is further configure to at least receive an indication of the interest of the first user in the attribute.

26. The system of claim 25, wherein, based at least partly on the indication of the interest of the first user in the attribute, the review creation component is further configure to at least output a graphical user interface that enables the user to create the review of the selected item and provide the feedback about the attribute.

27. The method of claim 1, wherein the explicit attribute interest cues include one or more of search terms entered by the second user, terms selected by the second user to narrow results of a search, and a length of time the second user spent reading one or more reviews relating to an item attribute.

28. The method of claim 1, further comprising identifying implicit attribute interest cues from the behaviorally data and building the map of the attribute interests based at least partly on analyzing the implicit and explicit attribute interest cues, wherein the implicit attribute interest cues include one or both of a length of time the second user spent looking at a tracked portion of a page and shared attributes among items the second user has selected for viewing or purchase.

* * * * *